US008346233B2

(12) United States Patent
Aaron et al.

(10) Patent No.: US 8,346,233 B2
(45) Date of Patent: Jan. 1, 2013

(54) DEVICES, METHODS, AND COMPUTER-READABLE MEDIA FOR PROVIDING SEVICES BASED UPON IDENTIFICATION OF DECISION MAKERS AND OWNERS ASSOCIATED WITH COMMUNICATION SERVICES

(75) Inventors: Jeffrey Aaron, Atlanta, GA (US); Robert Streijl, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1083 days.

(21) Appl. No.: 12/253,157

(22) Filed: Oct. 16, 2008

(65) Prior Publication Data

US 2010/0099392 A1 Apr. 22, 2010

(51) Int. Cl.
*H04W 88/00* (2009.01)
(52) U.S. Cl. .......................... 455/418; 706/47
(58) Field of Classification Search ............... 455/185.1, 455/418–420, 514; 706/47
See application file for complete search history.

(56) References Cited

U.S. PATENT DOCUMENTS

| | | | | |
|---|---|---|---|---|
| 6,272,545 | B1 * | 8/2001 | Flanagin et al. | 709/228 |
| 6,553,232 | B1 | 4/2003 | Shaffer et al. | |
| 6,826,150 | B1 | 11/2004 | Bhattacharya et al. | |
| 6,947,750 | B2 | 9/2005 | Kakani et al. | |
| 7,630,986 | B1 | 12/2009 | Herz et al. | |
| 7,796,190 | B2 | 9/2010 | Basso et al. | |
| 7,904,360 | B2 * | 3/2011 | Evans | 705/35 |
| 7,969,990 | B2 | 6/2011 | Shmueli et al. | |
| 7,975,062 | B2 | 7/2011 | Krikorian et al. | |
| 2003/0154242 | A1 | 8/2003 | Hayes et al. | |
| 2004/0042489 | A1 | 3/2004 | Messick et al. | |
| 2004/0253940 | A1 | 12/2004 | Andrews et al. | |
| 2005/0157660 | A1 | 7/2005 | Mandato et al. | |
| 2006/0020646 | A1 * | 1/2006 | Tee et al. | 707/205 |
| 2006/0025149 | A1 | 2/2006 | Karaoguz et al. | |
| 2006/0092037 | A1 | 5/2006 | Neogi et al. | |
| 2007/0050492 | A1 | 3/2007 | Jorgensen | |
| 2007/0133428 | A1 | 6/2007 | Taylor et al. | |
| 2007/0162966 | A1 * | 7/2007 | Agrawal et al. | 726/6 |
| 2007/0198682 | A1 | 8/2007 | Pazhyannur et al. | |
| 2007/0202923 | A1 | 8/2007 | Jung et al. | |
| 2008/0008188 | A1 | 1/2008 | Buga et al. | |
| 2008/0240444 | A1 | 10/2008 | Shuster | |
| 2009/0005071 | A1 | 1/2009 | Forstall et al. | |
| 2009/0177721 | A1 * | 7/2009 | Mimatsu | 707/205 |
| 2009/0328087 | A1 | 12/2009 | Higgins et al. | |
| 2010/0005483 | A1 | 1/2010 | Rao | |
| 2010/0082567 | A1 | 4/2010 | Rosenblatt et al. | |

(Continued)

OTHER PUBLICATIONS

U.S. Appl. No. 13/495,920, filed Jun. 13, 2012, Aaron et al.

*Primary Examiner* — Cong Tran
(74) *Attorney, Agent, or Firm* — Woodcock Washburn LLP

(57) ABSTRACT

Devices, methods and computer-readable media for providing services based upon identification of decision makers and owners associated with communication services. Data for providing communication services based upon identification of decision makers associated with communication services is stored, wherein the data including a user profile and default template identifying a default decision maker for a service. Policy rules and the stored data are analyzed. A new decision maker for a particular service is identified based upon the analysis of the policy rules and the stored data. The communication services are provided to the identified new decision maker.

17 Claims, 4 Drawing Sheets

U.S. PATENT DOCUMENTS

2010/0099388 A1 4/2010 Aaron et al.
2010/0099392 A1* 4/2010 Aaron et al. ............... 455/418
2010/0100519 A1 4/2010 Aaron et al.
2010/0100613 A1 4/2010 Aaron et al.
2010/0100822 A1 4/2010 Aaron et al.
2010/0146527 A1 6/2010 Craib et al.

* cited by examiner

DEVICES, METHODS, AND COMPUTER-READABLE MEDIA FOR PROVIDING SEVICES BASED UPON IDENTIFICATION OF DECISION MAKERS AND OWNERS ASSOCIATED WITH COMMUNICATION SERVICES

CROSS-REFERENCE TO RELATED APPLICATIONS

This application is related to the following co-pending and commonly-assigned patent applications, which are hereby incorporated herein by reference in its respective entirety:

"DEVICES, METHODS, AND COMPUTER-READABLE MEDIA FOR PROVIDING CONTROL OF SWITCHING BETWEEN MEDIA PRESENTATION SCREENS" having Ser. No. 12/253,003;

"DEVICES, METHODS, AND COMPUTER-READABLE MEDIA FOR PROVIDING CALENDAR-BASED COMMUNICATION SYSTEM SERVICES" having Ser. No. 12/253,157;

"DEVICES, METHODS, AND COMPUTER-READABLE MEDIA FOR PROVIDING BROAD QUALITY OF SERVICE OPTIMIZATION USING POLICY-BASED SELECTIVE QUALITY DEGRADATION" having Ser. No. 12/253,178; and "DEVICES, METHODS, AND COMPUTER-READABLE MEDIA FOR PROVIDING QUALITY OF SERVICE OPTIMIZATION VIA POLICY-BASED REARRANGEMENTS" having Ser. No. 12/253,197.

BACKGROUND

Embodiments herein relate to systems, methods, and computer-readable media for providing services based upon identification of service decision makers. More particularly, the embodiments relates to devices, methods and computer-readable media for providing services based upon identification of decision makers and owners associated with communication services.

Wireless cell phone technology offers the convenience of keeping in contact with others at any place and at any time. Cell phones may connect wirelessly with a cell phone network to offer data and communication services. Cell phones often combine communication, digital photography, video game functions, video and audio-video viewing functions, etc. To take advantage of this added functionality, hybrid cell phones that combine short-range (WiFi), high-speed Internet access and cellular service have been marketed to allow users to make connections using a local wireless Internet access point and seamlessly switch over to a cell phone network whenever necessary. Moreover, cellular carriers have spent billions of dollars to upgrade their systems for high-speed data. The upgraded networks offer wide coverage that exceeds WiFi's short range.

The computing power and the functionality now present on mobile devices enables many new services and functions to be provided to communication system customers. In addition, such new services and functions present opportunities for new revenue streams for system carriers. By providing the new services and functions, the carriers are able to develop long-term relationships with both residential and corporate subscribers.

Control of applications, services and networks associated with a communication system can be achieved using a policy architecture. A policy architecture may include a rules engine plus enforcement points in applications and throughout the network. Accordingly, wireless systems are being built upon the promise of delivering new and different types of high-speed multimedia services. In this way, service providers can extend their offerings beyond basic network services to include also value-added services and specialized application services. The service management concept involves the ability to create, supervise, update and remove services on a networking platform so that service providers can deliver the new services adapted to the customer requirements and experiences, meeting the customer demand while fulfilling customer expectations.

For each account, there are one or more persons that may acts as a decision maker (DM). The DM may be an individual purchaser. For example, a father may purchase and be a DM for a service, but the wife and/or one or more of the children may also be DM's. A teenager may be the actual primary user of a service purchased by a parent, and so may be the "owner" or DM for that service. Accordingly, a service provider may interact with multiple users, especially as services become more capable and complex. As the likelihood of more than one DM existing for an account, there is a critical need to be able to identify DM's for a service, to determine how those persons are DM's, and to be able to make good decisions of many kinds based on that determination, e.g. to interact with the right persons in any given situation.

It is respect to these and other considerations that the embodiments described herein have been made.

SUMMARY OF THE INVENTION

According to exemplary embodiments, methods, computer-readable media, and devices provide services based upon identification of decision makers and owners associated with communication services.

According to one embodiment, data for providing communication services based upon identification of decision makers associated with communication services is stored, wherein the data includes a user profile and default template identifying a default decision maker for a service. Policy rules and the stored data are analyzed. A new decision maker for a particular service is identified based upon the analysis of the policy rules and the stored data. The communication services are provided to the identified new decision maker.

These and other features and advantages, which characterize the embodiments, will be apparent from a reading of the following detailed description and a review of the associated drawings. It is to be understood that both foregoing general description and the following detailed description are exemplary and explanatory only and are not restrictive of embodiments, as claimed.

DETAILED DESCRIPTION

In the following description of the embodiments, reference is made to the accompanying drawings that form a part hereof, and in which is shown by way of illustration the specific embodiments in which the invention may be practiced. It is to be understood that other embodiments may be equally applicable to providing services based upon identification of decision makers and owners associated with communication services.

Figure 1:
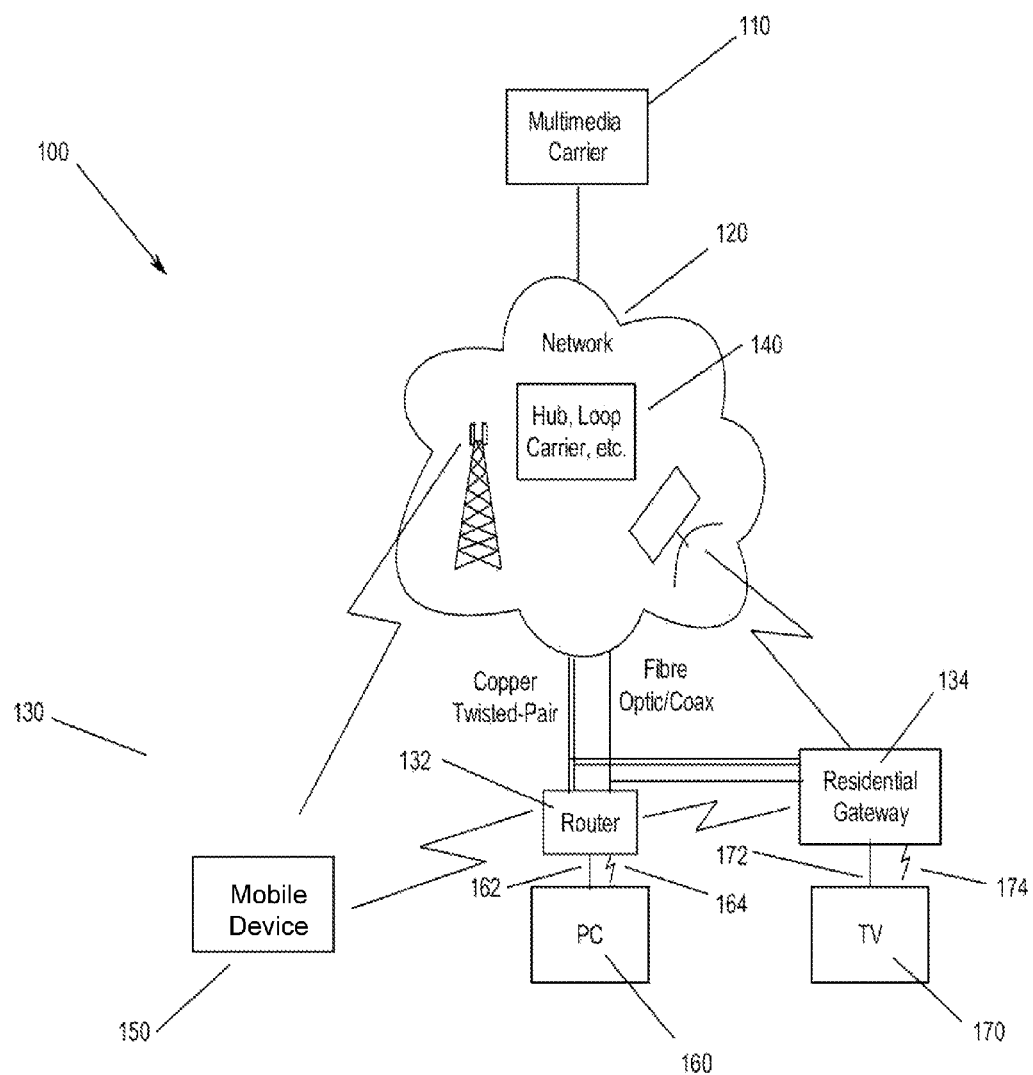
FIG. 1 illustrates a general block diagram of a media and communication network according to an exemplary embodiment.

FIG. 1 illustrates a general block diagram 100 of a media and communication network according to an exemplary embodiment. A multimedia carrier 110 is configured to provide hardware and software infrastructure for the delivery of content and for providing communication channels for subscribers or other users. Examples of communication channels include telephone services, Internet access, voice-over-IP, interactive television and gaming, etc. The multimedia carrier 110 acquires programming from content providers and encodes the content. The multimedia carrier 110 may also add local programming and provide additional digital services such as video on demand, and storage for content according to user directions.

The multimedia carrier 110 is coupled to a network 120 for distributing the content, providing Internet access, telephone services, etc. The network 120 provides the intermediate infrastructure between the point-of-delivery 130 and the multimedia carrier 110. The network 120 may be configured to provide one or more or the intermediate infrastructure 140 for television content delivery, plain-old-telephone system, satellite television, Internet services, wireless communications, such as cellular mobile phone services, etc. Accordingly, the network may include hub offices, IP service offices, local loop carrier facilities, satellite carrier facilities, communication satellites, telecom point-of-presence, mobile switching centers, base stations, and distribution nodes.

At the point-of-delivery 130, a router 132 may be used to provide digital services, such as Internet access. A computer or other Internet-capable device 160 may be coupled to the router 132 by a network cable 162 or wirelessly 164. A residential gateway 134 may be used to provide content, e.g., IPTV, to multimedia-capable viewing devices, such as a television, via a cable 172 or wirelessly 174. A mobile device 150 operates within a mobile operating system. Examples of such mobile devices 150 may include cell phones, smart phones, handheld computers, personal digital assistants, etc.

In addition, mobile devices 150 may be configured to use location-based services (LBS) to receive information specific to a location. Some examples of location-based services include requesting the nearest business or service, such as an ATM or restaurant, and finding a friend. A service provider may obtain the location of a mobile device from a global positioning system (GPS) circuit built into the device, or by using radiolocation and triangulation based on the signal-strength of the closest cell-phone towers (for phones without GPS features). Any other suitable means of obtaining or estimating location may also be used.

Figure 2:
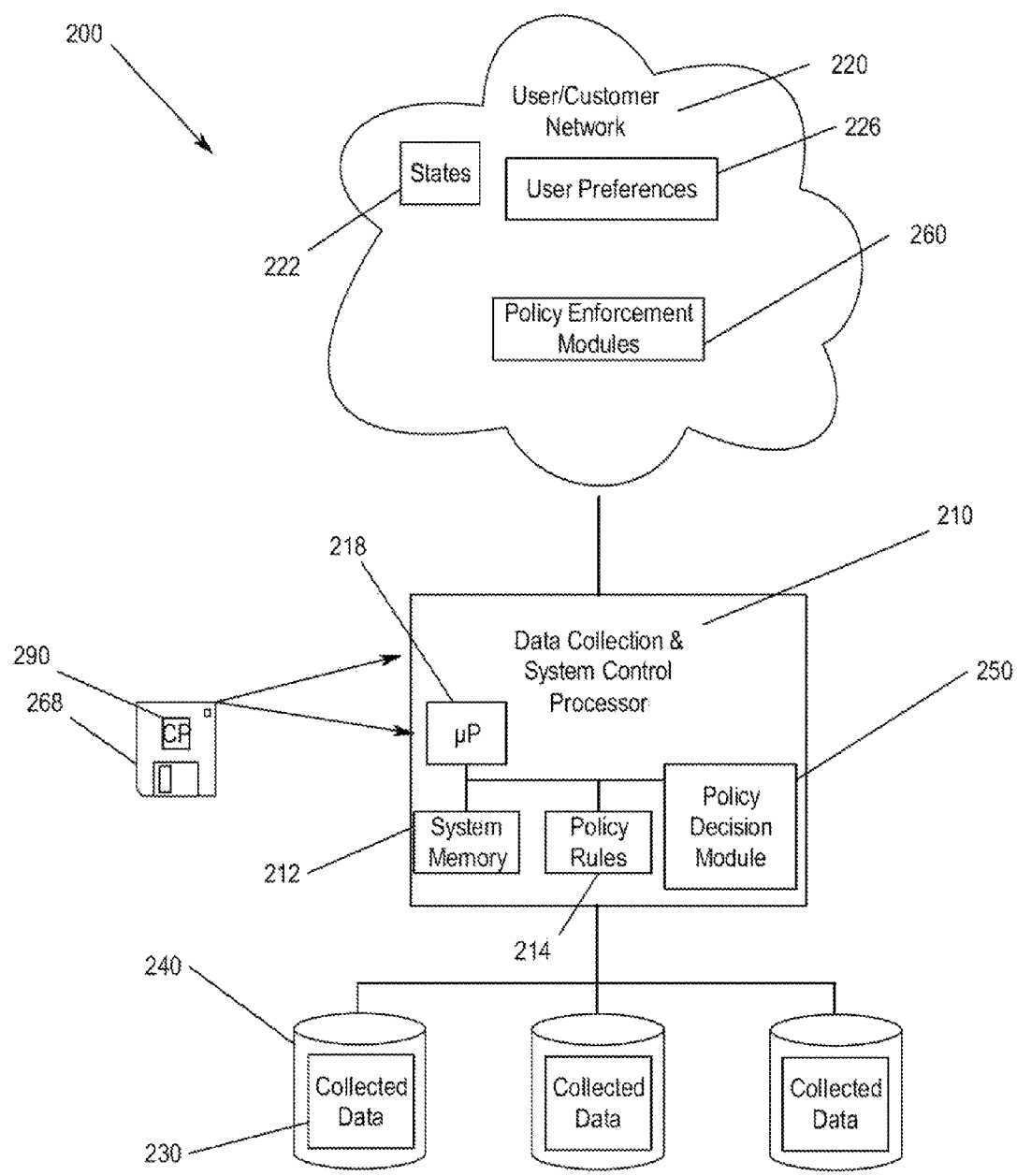
FIG. 2 illustrates a system for providing services based upon identification of decision makers and owners associated with communication services according to an exemplary embodiment.

FIG. 2 illustrates a system 200 for providing services based upon identification of decision makers and owners associated with communication services according to an exemplary embodiment. Policy rules engine plus enforcement points in applications enable a service provider to identify DM's for a service, to determine how those persons are DM's, and to be able to make good decisions of many kinds based on that determination, e.g. to interact with the right persons in any given situation. As shown in FIG. 2, a data collection and system control processor 210 includes a policy decision module 250 that makes decisions based on the collected data 230. Based upon the collected data 230, the data collection and system control processor 210 may identify different system states 222, such as the state of the network, various states of network-related equipment such as routers and firewalls, various states of service-related equipment such servers, the state of a service provided to a user, even the state of a customer, or other more fine-grained managed object states. The data collection and system control processor 210 may also identify functions, services, event suggestions, etc. that may be of interest to a customer. Inferences regarding what users like, need, and would be inclined to prefer can also be obtained. The policy decision module 250 uses the collected data 230 to identify DM's for a service thereby improving the quality of service as well as services provided to customers.

The data collection and system control processor 210 gathers information from across the network of users 220. The data collection and system control processor 210 collects and controls the system based upon collected data 230. The data collection and system control processor 210 includes memory 212, policy rules 214, a policy decision module 250 and a processor 218. The processor 218 controls the functions, analysis and manipulation of collected data 230, applies policy rules 214. Based on the policy rules 214, the policy decision module identifies the appropriate decision maker. The processor 218 uses the policy rules 214 and the collected data 230 to identify suggestions or network changes to perform for the identified decision maker. To accomplish the operations of embodiments, the policy enforcement functions 260 may be used to activate or implement the identified services or functions as discussed herein.

The data collection and system control processor 210 also obtains the user preferences 226 and builds profiles on users based on the activities of the users. The collected data 230 is stored in a database 240 or other suitable means of storage, e.g., flash memory. The database 240 may also be used to store relevant information regarding users, user preferences, allowable actions, rule parameters such as decision thresholds, and large numbers of various indexed suggestions. Accordingly, the data collection and system control processor 210 may be configured to manage a customer's services, applications and network functions.

The policy decision module 250 makes policy based determinations of interaction with service decision makers allows a service provider to identify the owner of each service, to identify the best person to call regarding the service, to identify the person that pays the bill, etc. There may be many people in a home or other group, such as a work group, which may act as a decision maker for any particular service. Further, the decision maker for a service may change over time. Policy based determination of interaction with service decision makers allows service providers to better market their services and thereby increase sales. When marketing services, the service provider does not want to bother somebody that is not relevant.

The policy decision module 250 may be configured to automatically make changes in the network and the infrastructure for an identified decision maker associated with the service. Thus, whether that person is a decision maker, an influencer, or just a user, is important to know. Rather than making changes, suggestions may be presented to a decision maker. In addition, a script for a sales representative may be modified based upon whether the policy decision module 250 determines that a sales representative is talking to the decision makers. If the sales representative is not talking to a decision maker, the script may be modified to allow a sales representative to request the decision maker. Identifying decision makers by the policy decision module 250 may involve determining preferences or profiles of users of services. Initially, templates for identifying a decision maker may be provided as a default, e.g., the person the account is registered to. However, the policy decision module 250 is configured to determine the best person to contact.

The policy decision module 250 allows the processor 218 to analyze the data 230 and determine decision makers associated with different aspects of services associated with an account, e.g. aspects of video, aspects of audio, aspects of gaming, aspects of simulation, aspects of messaging, all bundled up in different ways for different services and the different people in a group. For example, for video services, there may a single owner, multiple owners or multiple decision makers. Thus, the policy decision module 250 identifies the priority scheme regarding decision makers. The policy decision module may use different information with policy rules 214 to make the decision. The data 230 may be analyzed by the policy decision module 250 to identify who is logging onto a website the most, who contacts the account owner the most, who pays the bill, who tends to call for assistance. Other data 230 may be collected during a call. The data 230 may also include corrections made by customers provided as feedback.

The policy decision module 250 allows services, applications and function to be change for certain users if the policy decision module 250 determines the user is a decision maker. The policy decision module 250 may be configured to make suggestions associated with offerings of the service provider to an identified decision maker. Customers do not want to see promotions unless they are the right person that should see the promotions. Alternatively, the policy decision module 250 may give the decision maker a higher priority in the network because it is more important for the service provider to maintain contact with the decision maker than others. Accordingly, the policy decision module 250 may identify some services that are more pertinent to some sets of users, e.g., employees or family members.

The policy decision module 250 may access data 230 regarding the network that indicates that a potential decision maker is using a cell phone that appears to be located on a freeway, whereas the person at the next level down in the decision maker hierarchy is on a computer. Thus, the policy decision module 250 may decide to provide a promotion to the person using the computer rather than the person that is potentially driving. Additional factors that the policy decision module 250 may take into account may include the time of day, the location, the end device or log in point, etc. The policy decision module 250 may also analyze the data 230 so that information may be provided to other service providers for a fee.

Some people may not be decision makers, but are identified as influencers. Among influencers, there may also be strong and weak influencers. The policy decision module 250 uses this data to make appropriate decisions on whom to contact or to send promotions. The policy decision module 250 may also decide that some people need to be given password access to some website that you're setting up automatically that would allow them to change parameters and change how their service is provided. The data 230 may include a list of who gets certain content. Thus, if the decision maker changes, the policy decision module 250 may change that list and change how the network is going to route services or content.

As stated above, policy rules may initially be provided in a default state. Thus, the policy decision module 250 may implement policy rules that are initially in a default state, e.g., the policy rules may be assigned by the service provider based on the type of service and what is known about the customer and the customer's group. However, the policy rules may be changed based on usage history. The policy decision module 250 may also handle errors, wherein disputes, exceptions or errors arise, when a decision by the service owner is required, when defaults are unsatisfactory, etc.

FIG. 2 shows only one embodiment. However, other embodiments may take the form of an entirely software embodiment or an embodiment containing both hardware and software elements. Other embodiments may be implemented in software that includes, but is not limited to, firmware, resident software, microcode, etc. Furthermore, other embodiments may take the form of a computer program product 290 accessible from a computer-usable or computer-readable medium 268 providing program code for use by or in connection with a computer or any instruction execution system.

For the purposes of this description, a computer-usable or computer readable medium 268 can be any apparatus that can contain, store, communicate, propagate, or transport the program for use by or in connection with the instruction execution system, apparatus, or device. The medium 268 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code for providing data collection and system control according to an exemplary embodiment may include at least one processor 210 coupled directly or indirectly to memory elements 212. The memory elements 212 can include local memory employed during actual execution of the program code, bulk storage, and cache memories which provide temporary storage of at least some program code in order to reduce the number of times code must be retrieved from bulk storage during execution.

Accordingly, the computer program 290 comprise instructions which, when read and executed by the system 200 of FIG. 2, causes the system 200 to perform the steps necessary to execute the steps or elements of embodiments. Moreover, the functionality associated with the processor 218 for providing data collection and system control 210 may be centralized or partially to fully distributed and included in any piece of equipment or any portion of software in the system 200. Accordingly, the data collection and control framework may be distributed across the system 200. Further, the data collection and control 210 may be configured as an overlay over the system infrastructure to offer the services, functions and suggestions discussed above. Still further, the interaction with decision makers may be automated, semi-automated, or manual.

Figure 3:
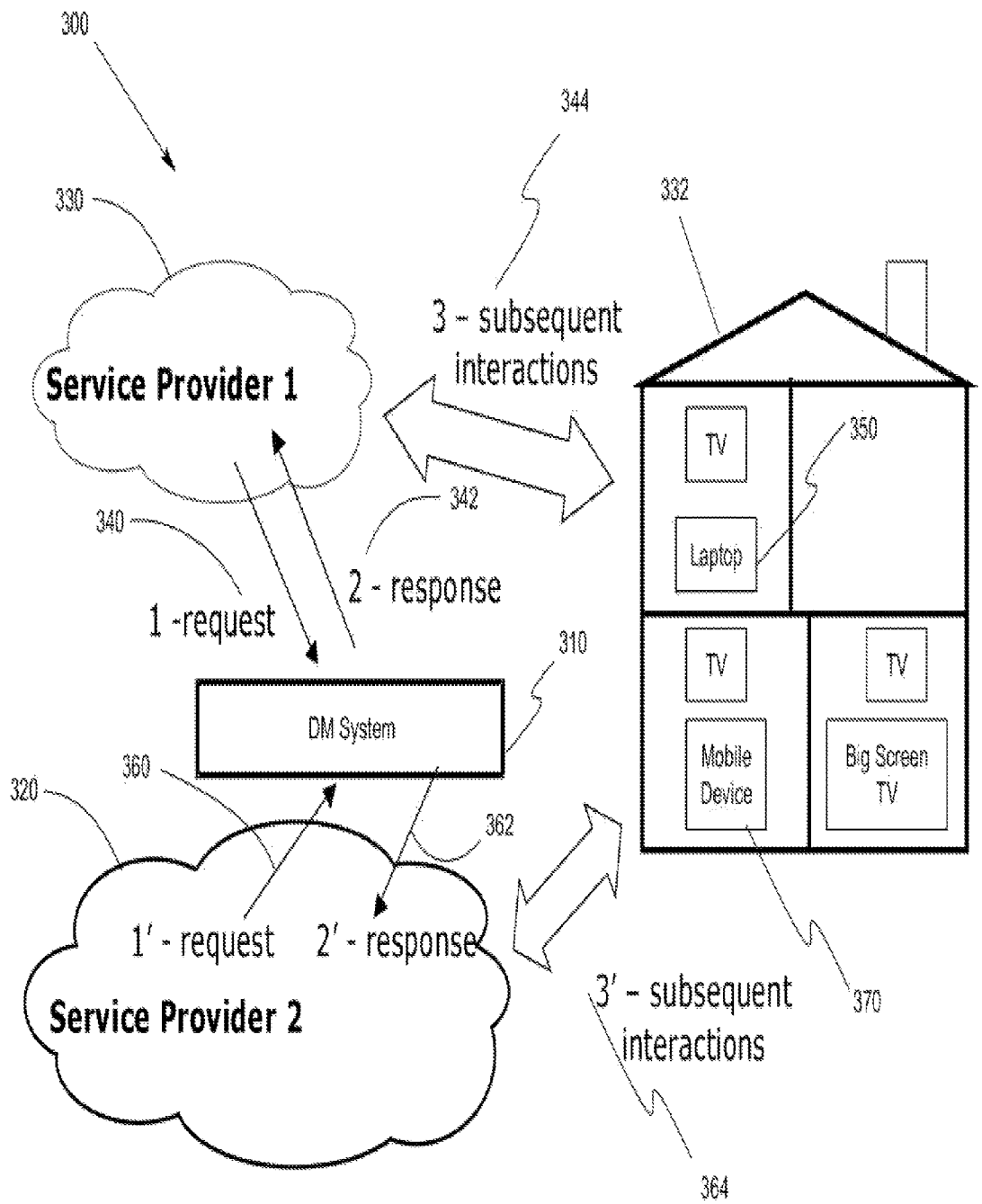
FIG. 3 illustrates the operation policy-based determination of decision makers according to an exemplary embodiment.

FIG. 3 illustrates the operation policy-based determination of decision makers according to an exemplary embodiment. In FIG. 3, a decision making system 310 is hosted by a service provider, i.e., service provider 2 320. Another service provider, i.e., service provider 1 330 may also access the decision making system 310. This access by service provider 1 330 may be structured by fee payment to service provider 2 320 or any other type of arrangement.

Service customers are shown residing in a building. The service customers may subscribe to services provided by service provider 1 330 and/or service provider 2 320. Service provider 1 330 makes a request 340 to decision making system 310 and decision making system 310 returns a response 342 identifying a decision maker 350 to service provider 1 330. Service provider 1 330 then may interact 344 with the decision maker 350 provided in the response 342. Likewise, service provider 2 320 makes a request 360 to decision making system 310 and decision making system 310 returns a response 362 identifying a decision maker 370 to service provider 2 320. Service provider 2 320 then may interact 364 with the decision maker 370 provided in the response 362.

Figure 4:
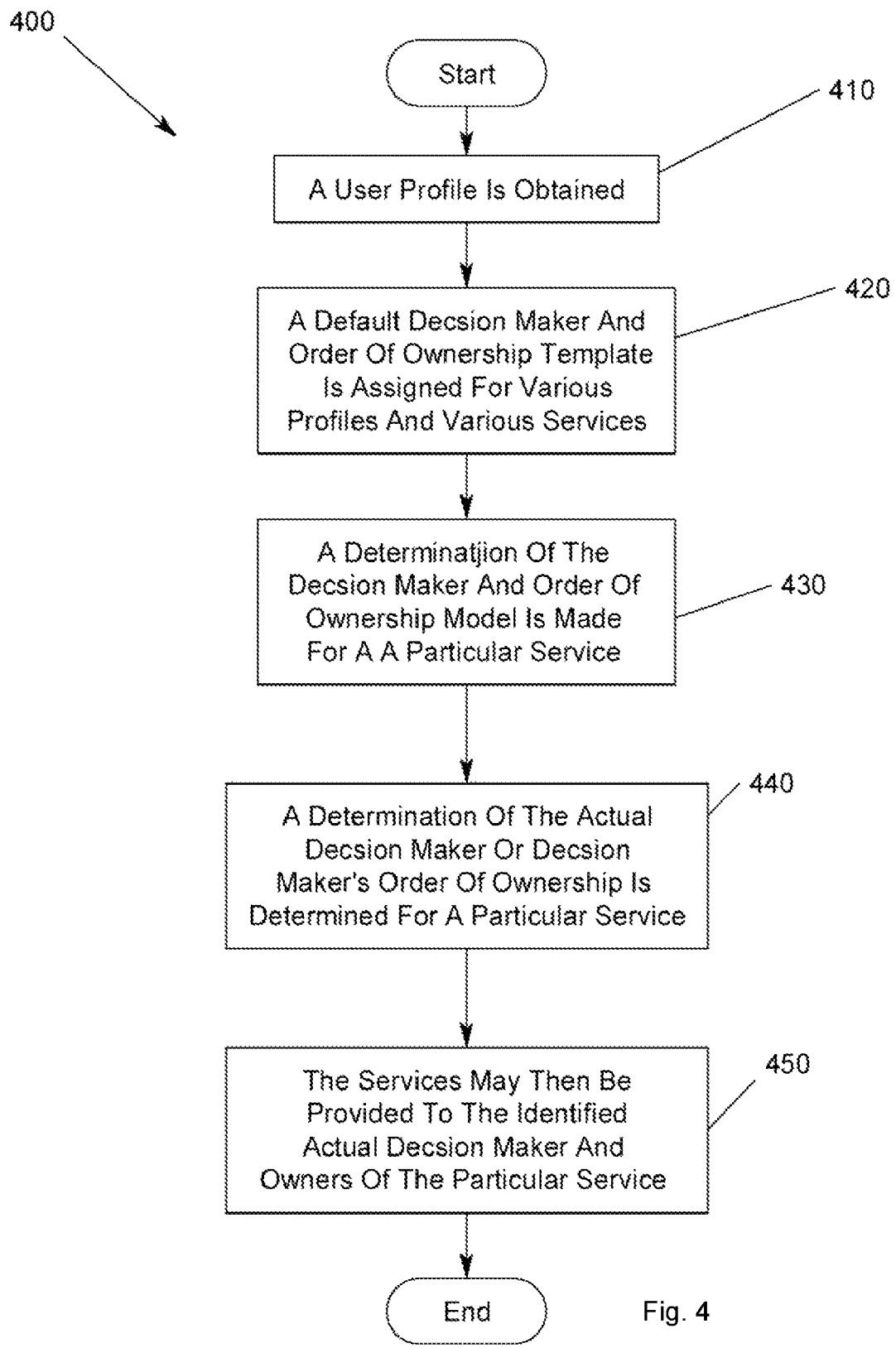
FIG. 4 is a flow chart of a method for providing services based upon identification of decision makers and owners associated with communication services according to an exemplary embodiment.

FIG. 4 is a flow chart 400 of a method for providing processor controlled services based upon identification of decision makers and owners associated with communication services according to an exemplary embodiment. A user profile is obtained 410. For instance, a user profile may be obtained from a user policy system and/or other system that supports profile/profiling, via one or more sign-up processes, via web page or other interactive capability, etc. The user profile may include anything important to know about the customer and the customer's group, e.g., family, business type and size, etc. A default decision maker (DM) and order of ownership template is assigned for various profiles and various services 420. A determination of the DM and order of ownership model is made for a particular service 430. The determination of the DM and order of ownership model is based on policy rules operating on user profiles, templates, service provider parameter information, user history, and other data. The determination of the DM and order of ownership model may also be selected at sign-up. Models may include a single owner, multiple owners with order of priority possibly including veto power, at least on some issues, and multiple owners, who must agree, at least on some specified issues. All aspects of decision maker determinations may have default settings: ownership is pertinent when disputes, exceptions and errors arise, when a decision by the service owner is required, when defaults are unsatisfactory, etc.

A determination of the actual DM or DM's order of ownership is determined for a particular service 440. The determination may be based on policy rules operating on data obtained by monitoring who is logging in to a website the most, who pays the bill, who calls for assistance, whoever is interacting with the service provider the most, etc. Optionally, the actual DM or DM's/order of ownership for the particular service may be published. For example, a listing of the actual DM or DM's/order of ownership for the particular service may be provided via a password-protected customer accessible web page. Also, modification of DM or DM's/order of ownership may be enabled using a manual service provider re-configuration process, e.g., initiated by a service rep talking to a customer. Modification of DM or DM's/order of ownership may be enabled using a web page or other interactive capability. An owner or DM could also be allowed to delegate their authority for a certain time period or situation. The services may then be provided to the identified actual DM and owners for the particular service 450.

Accordingly, devices, methods and computer-readable media provide services based upon identification of decision makers and owners associated with communication services. Adjustment and learning of roles may be based on usage. A variety of rules, options and models regarding decision-making may be implemented. Different roles may be provided for different aspects of a service.

The above specification, examples and data provide a complete description of the manufacture and use of the composition of the invention. Since many embodiments of the invention can be made without departing from the spirit and scope of the invention, the invention resides in the claims hereinafter appended.

We claim:
1. A device comprising:
memory for storing data for providing services based upon identification of decision makers associated with communication services, the data comprising a user profile and default template identifying a default decision maker for a service; and
a controller for:
analyzing policy rules and the stored data;
identifying a new decision maker for a particular service based on the analysis of the policy rules and the stored data;
providing the services to the identified new decision maker; and
determining an order of ownership model for the services selected from a group comprising a single owner, multiple owners with order of priority possibly including veto power for at least some issues, and multiple owners that agree at least on some specified issues.

2. The device of claim 1, the decision maker and the order of ownership are reconfigurable.

3. The device of claim 1, wherein the controller identifies the new decision maker for the service based on applying the policy rules to user profiles, templates, service provider parameter information, and user history.

4. The device of claim 1, wherein the controller identifies the new decision maker when disputes, exceptions and errors arise, when a decision by the service owner is required, and when defaults are unsatisfactory.

5. The device of claim 1, wherein the policy rules are applied to data obtained by monitoring who is logging in to a website the most, who pays the bill, who calls for assistance, and who is interacting with the service provider the most.

6. The device of claim 1, wherein the controller publishes the new decision maker for the particular service identified by the controller.

7. The device of claim 1, wherein the controller provides the identified new decision maker in a listing on a password-protected customer accessible web page.

8. The device of claim 1, wherein authority of a decision maker is delegated according to a predetermined condition.

9. A computer-readable medium that is not a transient signal per se, the computer-readable medium having computer-executable instructions stored thereon that, when executed, cause a computer system to perform operations comprising:
storing data for providing communication services based upon identification of decision makers associated with communication services, the data comprising a user profile and default template identifying a default decision maker for a service;
analyzing policy rules and the stored data;
identifying a new decision maker for a particular service based upon the analysis of the policy rules and the stored data;
determining an order of ownership model for the services selected from a group comprising a single owner, multiple owners with order of priority possibly including veto power for at least some issues, and multiple owners that agree at least on some specified issues; and
providing the communication services to the identified new decision maker.

10. The computer-readable medium of claim 9, the operations further including reconfiguring the identification of the decision maker and the order of ownership.

11. The computer-readable medium of claim 9, wherein the identifying a new decision maker for a particular service based upon the analysis of the policy rules and the stored data further comprises identifying the new decision maker for the service based on applying the policy rules to user profiles, templates, service provider parameter information, and user history.

12. The computer-readable medium of claim 9, wherein the identifying a new decision maker for a particular service further comprises identifying the new decision maker when disputes, exceptions and errors arise, when a decision by the service owner is required, and when defaults are unsatisfactory.

13. The computer-readable medium of claim 9 the operations further including applying the policy rules to data obtained by monitoring who is logging in to a website the most, who pays the bill, who calls for assistance, and who is interacting with the service provider the most.

14. The computer-readable medium of claim 9, the operations further including publishing the new decision maker for the particular service.

15. The computer-readable medium of claim 9, the operations further including delegating authority of a decision maker according to a predetermined condition.

16. A method comprising:
storing data for providing communication services based upon identification of decision makers associated with communication services, the data including a user profile and default template identifying a default decision maker for a service;
analyzing policy rules and the stored data;
identifying a new decision maker for a particular service based upon the analysis of the policy rules and the stored data;
determining an order of ownership model for the services selected from a group comprising a single owner, multiple owners with order of priority possibly including veto power for at least some issues, and multiple owners that agree at least on some specified issues; and
providing the communication services to the identified new decision maker.

17. The method of claim 16, the operations further comprising configuring ownership and decision makers for the services by applying the policy rules to data obtained by monitoring activity and identifying the new decision maker for the service based on applying the policy rules to data associated with a user.

* * * * *